US011005914B2

(12) United States Patent
Morgan et al.

(10) Patent No.: US 11,005,914 B2
(45) Date of Patent: May 11, 2021

(54) HIDDEN DESKTOP SESSION FOR REMOTE ACCESS

(71) Applicant: ConnectWise, LLC., Tampa, FL (US)

(72) Inventors: Jake Morgan, Raleigh, NC (US); Max Booth, Raleigh, NC (US)

(73) Assignee: ConnectWise, LLC., Tampa, FL (US)

( * ) Notice: Subject to any disclaimer, the term of this patent is extended or adjusted under 35 U.S.C. 154(b) by 0 days.

(21) Appl. No.: 16/600,060

(22) Filed: Oct. 11, 2019

(65) Prior Publication Data

US 2020/0120153 A1  Apr. 16, 2020

Related U.S. Application Data

(60) Provisional application No. 62/745,049, filed on Oct. 12, 2018, provisional application No. 62/755,728, filed on Nov. 5, 2018.

(51) Int. Cl.
*H04L 29/08* (2006.01)
*G06F 3/038* (2013.01)
*G06F 9/451* (2018.01)

(52) U.S. Cl.
CPC ............ *H04L 67/025* (2013.01); *G06F 3/038* (2013.01); *G06F 9/452* (2018.02); *H04L 67/28* (2013.01); *G06F 2203/0383* (2013.01)

(58) Field of Classification Search
CPC .......... G06F 9/452; H04L 67/02; H04L 67/28
See application file for complete search history.

(56) References Cited

U.S. PATENT DOCUMENTS

| | | | |
|---|---|---|---|
| 8,996,642 B1* | 3/2015 | Bellini, III | H04N 21/4788 709/206 |
| 2003/0065731 A1 | 4/2003 | Mohammed et al. | |
| 2007/0171921 A1* | 7/2007 | Wookey | G06F 9/5027 370/401 |
| 2007/0174429 A1* | 7/2007 | Mazzaferri | H04L 67/02 709/218 |
| 2007/0266135 A1 | 11/2007 | Friedland et al. | |
| 2008/0288301 A1* | 11/2008 | Emling | G06F 16/168 705/4 |
| 2011/0213821 A1 | 9/2011 | Gentile et al. | |
| 2018/0060572 A1* | 3/2018 | Singleton | G06F 21/552 |
| 2018/0108022 A1* | 4/2018 | Bandera | G06Q 10/06316 |

OTHER PUBLICATIONS

International Search Report and Written Opinion on PCT PCT/US2019/055927 dated Jan. 8, 2020.

* cited by examiner

*Primary Examiner* — Maryam M Ipakchi
(74) *Attorney, Agent, or Firm* — Foley & Lardner LLP

(57) ABSTRACT

Systems and methods of the present disclosure are directed to providing remote access capabilities in information technology infrastructure. In particular, systems and methods of the present disclosure can provide remotely access capabilities to facilitate the management, configuration, or maintenance of information technology infrastructure.

20 Claims, 13 Drawing Sheets

User Interface 140

List of remote computing devices 142
- Remote computing device 122
- Remote computing device 146
- Remote computing device 148

FIG. 1B

HIDDEN DESKTOP SESSION FOR REMOTE ACCESS

CROSS-REFERENCE TO RELATED APPLICATION

The present application claims the benefit of priority under 35 U.S.C. § 119 to U.S. Provisional Patent Application No. 62/755,728, filed on Nov. 5, 2018, and claims the benefit of priority under 35 U.S.C. § 119 to U.S. Provisional Patent Application No. 62/745,049, filed Oct. 12, 2018, each of which is hereby incorporated by reference herein in its entirety.

FIELD OF THE DISCLOSURE

The present disclosure generally relates to providing remote access in information technology infrastructure. In particular, systems and methods of the present disclosure can provide a hidden desktop session that can be used for remote access to information technology infrastructure in order to remotely control capabilities to facilitate the management, configuration, or maintenance of information technology infrastructure.

BACKGROUND OF THE DISCLOSURE

Information technology infrastructure can include computing devices, networking devices, peripherals, accessories, or other devices that are connected to the network. Devices can malfunction or fail from time-to-time. However, due to the large number of devices, their remote location, the various types of devices, it can be challenging to actively monitor and manage the devices to efficiently remedy or address a malfunction or failure.

SUMMARY OF THE DISCLOSURE

Systems and methods of the present disclosure are directed to providing remote access in information technology infrastructure. In particular, systems and methods of the present disclosure can provide a virtual hidden desktop that can be used for remote access to information technology infrastructure in order to remotely control capabilities to facilitate the management, configuration, or maintenance of information technology infrastructure.

For example, the system can provide a web application having an interface with a command tab. The command tab can allow hosts to run commands against their guest machines from the web application. To provide greater interaction with the command prompt, and a fully interactive shell that allows for the performance of operations without disturbing the end user, the technical solution of the present disclosure provides a hidden desktop or backstage feature.

For example, a backstage component executing on one or more of the remote machine, host machine, or cloud server, can be configured to generate, create, initiate, launch or spawn a virtual or hidden desktop operating in the system session (e.g., session 0) of an end user's computing device. Such a hidden desktop can sometimes be referred to as a hidden desktop session. The backstage component can spawn the hidden desktop session responsive to when a host machine (e.g., a computing device operated by a technician or administrator) connects to a remote machine (e.g., a computing device operated by an end user). This hidden desktop session can launch a power shell, such as an automated task framework with a command line shell and a scripting language integrated into the .NET framework, which can be embedded within other applications. This hidden desktop session can also launch a command window by default. This hidden desktop session can also launch other applications, including interactive applications with a graphical user interface (GUI). The applications, including but not limited to the power shell and command window, can allow the host machine to access and work on the remote machine without interrupting the end user (e.g., who may be operating the remote machine), and without revealing the end user's display on the remote machine to the host machine. Thus, technicians can manage, debug, and remediate issues remotely through a host client interface of the technical solution of the present disclosure with a full interactive power shell and command window, without interfering with or observing the work of the end user.

At least one aspect of the present technical solution is directed to a method of remotely managing computing devices. The method can include identifying, by a remote management server, a first remote computing device according to a first support ticket. The method can include establishing, by the remote management server, one or more connections communicatively coupling the first remote computing device to a host computing device. The method can include hijacking, by the remote management server via the one or more established connections, a system session executed on the first remote computing device. The method can include transitioning, by the remote management server via the one or more established connections, the hijacked system session from a non-interactive state to an interactive state. The method can include generating, by the remote management server, a hidden desktop within the hijacked system session to be displayed on a display device of the host computing device. The method can include identifying, by the remote management server, one or more instructions inputted through the hidden desktop by the host computing device to update a configuration of the first remote computing device. The method can include terminating, by the remote management server responsive to a command from the host computing device, the hijacked system session by transitioning the hijacked system session from the interactive state to the non-interactive state.

In some embodiments, the method can further include closing, by the remote management server, the first support ticket in response to the one or more instructions being executed in a hidden manner the hijacked system session of the first remote computing device.

In some embodiments, the method can further include receiving, by the remote management server from a database storing the first support ticket associated with a first remote computing device, responsive to the first remote computing device generating the first support ticket. The method can further include receiving, by the remote management server from the database storing a second support ticket associated with either the first remote computing device or a second remote computing device, the second support ticket responsive to the first or second remote computing device generating the second support ticket. The method can further include determining, by the remote management server communicating with the database, a first priority of the first support ticket based on a first status of the first support ticket. The method can further include determining, by the remote management server communicating with the database, a second priority of a second support ticket based on a second status of the second support ticket. The method can further include determining that the first priority is higher than the second priority to identify the first remote computing device.

In some embodiments, transitioning the hijacked system session from a non-interactive state to an interactive state can further include adding, by the remote management server via the one or more established connections, a registry key to a registry of the first remote computing device to cause the hijacked system session to transition from the non-interactive state to the interactive state.

In some embodiments, the hidden desktop may include at least one of an interactive power shell and an interactive command prompt.

In some embodiments, the method can further include communicating, by the remote management server, with one or more web applications to provide one or more interactive user interfaces on the hidden desktop.

In some embodiments, the method can further include composing, by the remote management server, one or more windows stations within the hijacked system session to generate the hidden desktop.

In some embodiments, the method can further include transmitting, by the remote management server via the one or more established connections, the one or more instructions to the first remote computing device for execution in a hidden manner to close the first support ticket.

In some embodiments, the one or more instructions may be inputted through the hidden desktop by one or more input devices communicatively coupled to the host computing device.

In some embodiments, the method can further include providing, by the remote management server, one or more toolboxes to launch one or more web applications on the hidden desktop.

At least one aspect of the present technical solution is directed to a system that can remotely manage computing devices. The system can include a remote management server that includes one or more processors and memory. The remote management server can identify a first remote computing device according to a first support ticket. The remote management server can establish one or more connections communicatively coupling the first remote computing device to a host computing device. The remote management server can hijack a system session executed on the first remote computing device via the one or more established connections. The remote management server can transition the hijacked system session from a non-interactive state to an interactive state. The remote management server can generate a hidden desktop within the hijacked system session to be displayed on a display device of the host computing device. The remote management server can identify one or more instructions inputted through the hidden desktop by the host computing device to update a configuration of the first remote computing device. The remote management server can responsive to a command from the host computing device, terminate the hijacked system session by transitioning the hijacked system session from the interactive state to the non-interactive state.

In some embodiments, the remote management server can further close the first support ticket in response to the one or more instructions for execution in a hidden manner in the hijacked system session of the first remote computing device.

In some embodiments, the remote management server further add a registry key to a registry of the first remote computing device to cause the hijacked system session to transition from the non-interactive state to the interactive state.

In some embodiments, the hidden desktop may include at least one of an interactive power shell and an interactive command prompt.

In some embodiments, the remote management server can further communicate with one or more web applications to provide one or more interactive user interfaces on the hidden desktop.

In some embodiments, the remote management server can further compose one or more windows stations within the hijacked system session to generate the hidden desktop.

In some embodiments, the remote management server can further transmit the one or more instructions via the one or more established connections to the first remote computing device for execution in a hidden manner to close the first support ticket.

In some embodiments, the one or more instructions may be inputted through the hidden desktop by one or more input devices communicatively coupled to the host computing device.

In some embodiments, the remote management server can further provide one or more toolboxes to launch one or more web applications on the hidden desktop.

In some embodiments, the remote management server can receive, from a database storing the first support ticket associated with a first remote computing device, responsive to the first remote computing device generating the first support ticket. The remote management server can receive, from the database storing a second support ticket associated with either the first remote computing device or a second remote computing device, the second support ticket responsive to the first or second remote computing device generating the second support ticket. The remote management server can determine a first priority of the first support ticket based on a first status of the first support ticket. The remote management server can determine a second priority of a second support ticket based on a second status of the second support ticket. The remote management server can determine that the first priority is higher than the second priority to identify the first remote computing device.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims.

FIGS. 1B-1G are illustrative operations or graphical user interfaces provided by the system depicted in FIG. 1A.

DETAILED DESCRIPTION OF THE DISCLOSURE

Figure 1A:
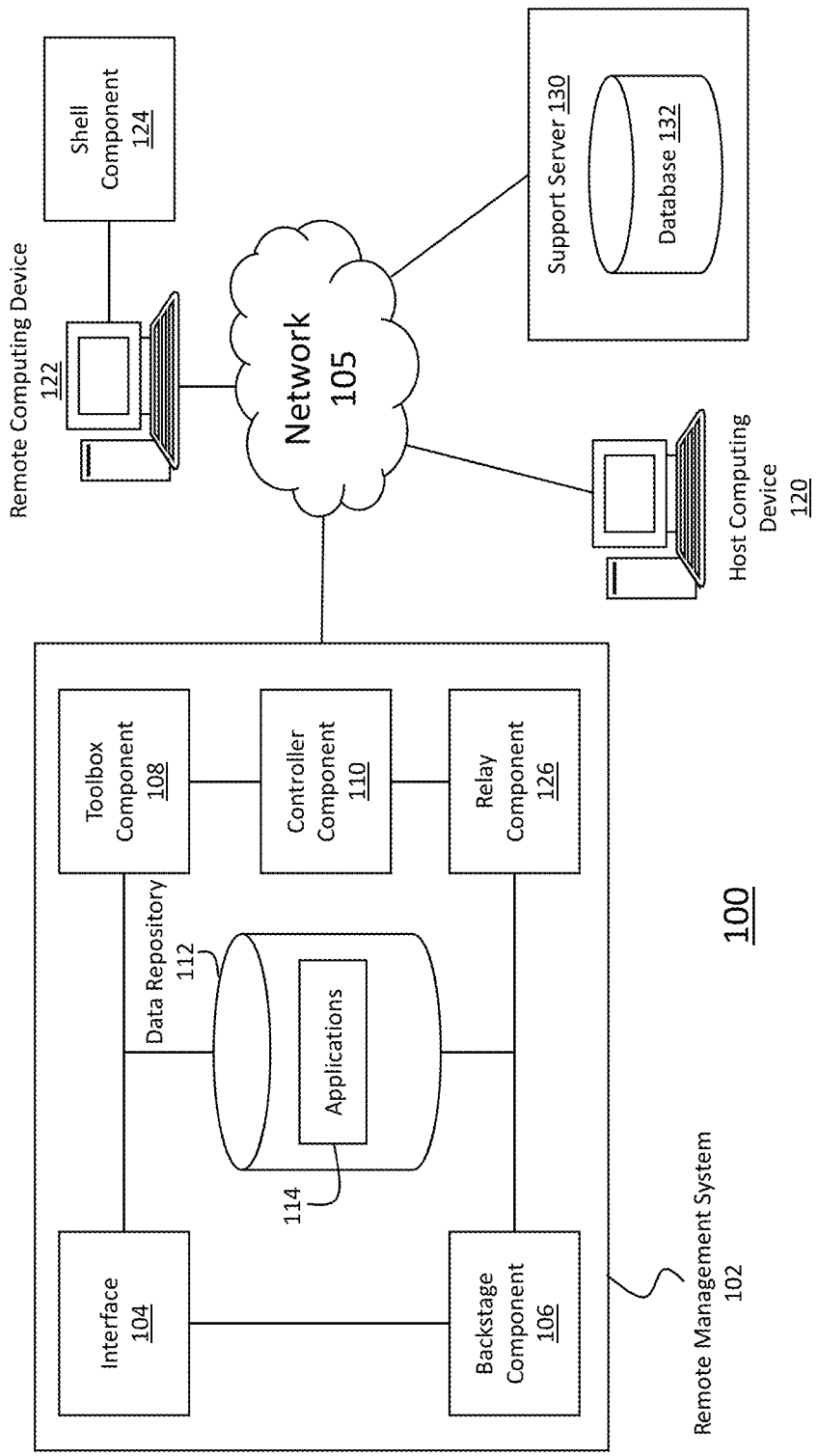
FIG. 1A is an illustrative block diagram of an example embodiment of a system for remote perspective and control of information technology infrastructure.

Many companies outsource their information technology (IT) services to outside IT service providers. Such an approach can be more economical for the companies because the companies may not have enough ongoing need to support a full time IT support technician. The IT service provider can share the time of one technician across multiple companies and efficiently provide service to a number of smaller companies in this way. In addition, with economies of scale, an IT service provider can afford to hire technicians with expertise in specific areas and be more efficient in providing service in those areas. IT service providers often use software tools to help manage their own support business, and the tools can help to automate the monitoring, service, and configuration of their customers.

Technical solutions of the present disclosure can provide a web application having an interface with a command tab. The command tab can allow hosts to run commands against their guest computing devices from the web application. To provide greater interaction with the command prompt, and a fully interactive shell that allows for the performance of operations without disturbing the end user, the technical solution of the present disclosure provides a hidden desktop or backstage feature.

For example, a backstage component executing on one or more of the remote computing device, host computing device, or cloud server, can be configured to generate, create, initiate, launch or spawn a hidden or virtual desktop operating in the system session of an end user's computing device. In some embodiments, such a hidden desktop may be referred to as a hidden desktop session. The backstage component can spawn the hidden desktop session responsive to when a host computing device (e.g., operated by a technician or administrator) connects to a remote computing device (e.g., operated by an end user). This hidden desktop session can launch a power shell, such as an automated task framework with a command line shell and a scripting language integrated into the .NET framework, which can be embedded within other applications. This hidden desktop session can also launch a command window by default. This hidden desktop session can also launch other applications, including interactive applications with a GUI. The applications, including but not limited to the power shell and command window, can allow the host computing device to access and work on the remote computing device without interrupting the end user of the remote computing device. Thus, technicians can manage, debug, and remediate issues remotely through the host client interface of the present technical solution with a full interactive power shell and command window, without interfering with or observing the work of the end user.

The backstage component can create such a hidden desktop session to which the technician can remotely connect, access, control, or otherwise manage. By connecting to the hidden desktop session, the technician's actions on the remote computing device (e.g., used by the end user) are invisible to, or hidden from, the end user. Similarly, the end user's actions on the remote computing device can be invisible to, or hidden from, the technician. As such, while the end user is using a remote computing device that is required to be re-configured or served, normal operations of the remote computing device (e.g., actions of the end user) will not be affected or interrupted. Further, the end user's actions on the remote computing device, which may include certain confidential or private information, will not be subjected to be exposed.

According to some embodiments, the backstage component can select a specific existing logon system session (e.g., session 0) that is provided for system services. The backstage component can create a hidden "desktop" on this selected session so that applications launched on this session will be able to display their user interface. The backstage component can use a capturing technique (e.g., PrintWindow function) to render the graphics of each application and compose a desktop image by doing this for each application, lowest in z-order first.

Upon establishing the hidden desktop, the system can send commands or input/output, such as the mouse input and the keyboard input.

Thus, the technical solution of the present disclosure can provide improved ability to connect to a session without using authentication or connectivity of an existing facility, such as a remote desktop protocol.

Referring now to FIG. 1A, an illustrative block diagram of an example embodiment of a system 100 for remote control in information technology infrastructure is provided. In brief overview, the system 100 can include a remote management system ("RMS") 102. The system 100 can include, access or interact with one or more of a remote computing device 122 and a host computing device 120. The system can include, access or interact with one or more of a support server 130. The components or functions of the system 100 (e.g., 102, 120, 122, and 130) may communicate with one another via one or more networks 105. The system 100 can include one or more component or function depicted in FIGS. 3A-3D.

The remote management system 102 can be executed by one or more servers (e.g., server 306a) or a cloud 308 or on one or more processors (e.g., main processor 321). The RMS 102 can include a host client interface, or interface, 104 designed and constructed to communicate with one or more of the remote computing device 122, the host computing device 120, and the support server 130. The host client interface 104 can include a port, networking protocol, or application programming interface. The host client interface 104 can include or provide a graphical user interface.

The remote computing device 122 can include, for example, a desktop, laptop, tablet computing, smartwatch, wearable device, augmented reality device, or virtual reality device. The remote computing device 122 can include a telecommunications device. The remote computing device 122 can include input devices such as a keyboard, touchpad, mouse, pointing device, joystick or voice input interface. The remote computing device 122 can include a virtual machine that is executed on a server, or a virtual machine executed in a cloud service or cloud computing environment.

In some embodiments, the remote computing device 122 can include a shell component 124. The shell component 124 can be executed on the remote computing device 122. An operating system of the remote computing device 122 can provide logon sessions for running applications, a facility for creating and remotely connecting to a new interactive logon session, such as a remote desktop protocol, or an existing logon session but with no interactive desktop.

The shell component 124 can, for example, facilitate setting up an interactive desktop for use with a logon session. The shell component 124 can start, initiate, identify, commandeer or otherwise establish an interactive application with a graphical user interface in that interactive desktop. This interactive desktop can include a power shell and a command prompt as applications within the interactive application. The shell component 124 can render application output and capture application output. The shell component 124 can communicate with the RMS 102 and host computing device 120 (e.g., either directly or via a relay component 126) to provide captured application output, for example, for display on the host computing device 120.

The shell component 124 can provide interactive input to the interactive desktop, such as mouse and keyboard input, or communicate with RMS 102 and host computing device 120 to receive interactive input commands, for example, to allow RMS 102 to control one or more application provided by the interactive desktop.

The host computing device 120 can include, for example, a desktop, laptop, tablet computing, smartwatch, wearable device, augmented reality device, or virtual reality device. The host computing device 120 can include a telecommunications device. The host computing device 120 can include input devices such as a keyboard, touchpad, mouse, pointing device, joystick or voice input interface. The host computing device 120 can include a virtual machine that is executed on a server, or a virtual machine executed in a cloud service or cloud computing environment. The host computing device 120 can use a browser configured with a real time streaming protocol to connect, interface or otherwise communicate with the remote computing device 122 or RMS 102.

The remote computing device 122 can be local to an entity, organization, office or location that includes information technology infrastructure that is receive support from an agent or support technician that uses the host computing device 120. The remote computing device 122 can capture images of hardware or software that is being supported or managed by the host computing device 120.

The support server 130 can include, interface with or otherwise communicate with a database 132 to retrieve a list of support tickets. A support ticket can refer to a ticket data structure that includes information that can facilitate resolving a technical problem associated with hardware or software component at a location of the remote computing device 122. Each support ticket can have an identifier and an association to a computing device. For example, in the illustrated embodiment of FIG. 1A, a first support ticket is associated with the remote computing device 122, and a second support ticket is associated with the remote computing device 122 or another remote computing device (not shown). The remote computing devices (e.g., 122) can communicate with the support server 130 to create, generate, or otherwise initiate respective support tickets, responsive to determining that the remote computing devices may need to be reconfigured, maintained, repaired, updated or served. Upon the support tickets being generated, the support server 130 can retrieve or obtain the statuses of the support tickets based on various respective factors (e.g., a timestamp regarding when a support ticket is generated), and store or otherwise manage the statuses in the database 132.

The RMS 102 can include, interface with or otherwise communicate with at least one host client interface 104, at least one backstage component 106, at least one toolbox component 108, at least one controller component 110, at least one relay component 126, and at least one data repository 112. The data repository 112 can include one or more data structures, data bases, or data files, such as applications 114. Applications 114 can refer to or include toolbox elements, such as applications that can be provided for execution via the hidden desktop session. Applications 114 can include, for example, a web browser, command prompt, file explorer, etc.

The host client interface 104, backstage component 106, toolbox component 108, controller component 110, or relay component 126 can each include at least one processing unit or other logic device such as programmable logic array engine, or module configured to communicate with the database repository 112. The host client interface 104, backstage component 106, toolbox component 108, controller component 110 and data repository 112 can be separate components, a single component, or part of the RMS 102. The system 100 and its components, such as a RMS 102, can include hardware elements, such as one or more processors, logic devices, or circuits.

The host client interface 104 can include any type of interface configured to facilitate communication between one or more component, system or device of system 100. The host client interface 104 can be configured to facilitate communication or interaction between components or elements of the RMS 102. The host client interface 104 can present, display or otherwise provide a graphical user interface or other user interface to facilitate user interaction with the RMS 102.

The host client interface 104 can include, communicate with or execute one or more application programming interfaces ("APIs"). The APIs can be configured to interact or interface with a remote computing device 122 or a host computing device 120. The host client interface 104 can include or utilize one or more cloud application programming interfaces. The interface can include or be based on, for example, a cloud API, Open Cloud Computing Interface ("OCCI"), or representation state transfer ("REST"). Responses and requests can be received or transmitted via the interface 104 using one or more protocol or language, such as, e.g., XML, HTML, JSON, HTTP, or SSL. Responses and requests can be received or transmitted via the host client interface 104 using one or more protocol or language, such as, e.g., XML, HTML, JSON, HTTP, or SSL.

The RMS 102 can be intermediary to the remote computing device 122 and the host computing device 120. In some cases, the remote computing device 122 can interact with the host computing device 120 directly. The relay component 126 of the RMS 102 can facilitate establishing a connection coupling the host computing device 120 to the remote computing device 122 either directly or through the relay component 126.

In some cases, the RMS 102 can establish a secure connection or session with the host computing device 120 and the remote computing device 122 using credentials, tokens or identifiers. The RMS 102 can undergo a handshaking process with the remote computing device 122 or host computing device 120 to establish the secure connection. During a secure connection, the RMS 102 may not need to re-authenticate for each transmission.

For example, using the relay component 126, the RMS 102 can establish a connection between remote computing device 122 and host computing device 120 using a proprietary protocol. Examples of the proprietary protocol includes at least one of: a transmission control protocol (TCP), a virtual network computing (VNC) protocol, a remote desktop protocol (RDP), or the like. The relay component 126 can establish the connection directly between remote computing device 122 and host computing device 120. The relay component 126 can establish or open a first connection from the remote computing device 122 to the relay component 126 of RMS 102, and a second connection from the host computing device 120 to the relay component 126, and the relay component 126 can manage, control, monitor, or otherwise facilitate communications between the remote computing device 122 and the host computing device 120.

The host client interface 104 can establish a communication channel with the remote computing device 122 and the host computing device 120. The host client interface 104 can include or utilize a real-time streaming protocol (RTSP), real-time transport protocol (RTP) or a real-time transport control protocol (RTCP) to stream media over network 105. RTSP can run over a variety of transport protocols, while RTP and RTCP can run over UDP. The host client interface 104 or interface 128 can be configured with one or more of the RTSP, RTP or RTCP protocols. The host client interface 104 or interface 128 can use a video coding format, such as H.264, HEVC, VP8 or VP9.

The backstage component 106 can utilize the interface 104 to communicate with the support server 130 to select, pinpoint, or otherwise identify a remote computing device (e.g., 122) according to a support ticket associated with the remote computing device. For example, in response to the remote computing device 122 generating a first support ticket in the database 132, the backstage component 106 can receive the first support ticket from the database 132. In response to the remote computing device 122, or another remote computing device, later generating a second support ticket in the database 132, the backstage component 106 can also receive the second support ticket from the database 132. In response to the reception of the support tickets, the backstage component 106 can determine the priorities of the first and second support tickets based on the respective statuses such as, for example, the timestamps regarding when the first and second support tickets were generated. As such, the backstage component 106 can identify a remote computing device that has a highest priority to be served. Continuing with the above example, the backstage component 106 may determine the priority of the first support ticket to be higher than the priority of the second support ticket in response to identifying that the timestamp of the first support ticket is earlier than the timestamp of the second support ticket. In another example, the backstage component 106 may determine the priority of the first support ticket to be higher than the priority of the second support ticket in response to identifying that the remote computing device 122 that generates the first support ticket has a privilege, according to an organization policy, over the remote computing device that generates the second support ticket.

In response to identifying the remote computing device, the backstage component 106 can cause the host client interface 104 or relay component 126 to establish one or more connections communicatively coupled the identified remote computing device to a host computing device. For example, the RMS 102 can use the host client interface 104 or relay component 126 to establish a connection between the remote computing device 122 and host computing device 120 using a proprietary protocol. The RMS 102 can establish the connection directly between the remote computing device 122 and host computing device 120. The RMS 102 can establish or open a first connection from the remote computing device 122 to the relay component 126 of the RMS 102, and a second connection from the host computing device 120 to the relay component 126, and the relay component 126 can manage, control, monitor, or otherwise facilitate communications between the remote computing device 122 and the host computing device 120.

In response to establishing the connection between the identified remote computing device and host computing device, the backstage component 106 can hijack, commandeer, overtake or otherwise utilize a system session executed on the remote computing device via the connection. For example, the backstage component 106 can select a specific existing logon system session (e.g., session 0) executed on the remote computing device 122 that is provided for system services. The backstage component 106 can communicate with the shell component 124 executing on the remote computing device 122 to hijack, commandeer, overtake or otherwise utilize the system session of the remote computing device 122. In some embodiments, the system session can provide a separate windows station that is initially marked as non-interactive and used for windows services. By hijacking such a system session, the backstage component 106 can perform various actions on the hijacked system session (e.g., create a graphical environment on session 0, transmit the graphical environment to the host computing device 120, etc., which shall be discussed below) without interrupting an end user of the remote computing device 122.

In response to hijacking the system session of the remote computing device, the backstage component 106 can transition or change the system session from a non-interactive state to an interactive state. The backstage component 106 may add a registry key to a registry of the remote computing device to cause the hijacked system session to transition from the non-interactive state to the interactive state. For example, computer software executed on the remote computing device 122, such as operation systems and applications, may use configuration data to control the start-up and operational behavior of the software. Such configuration data is stored in a data structure known as the WINDOWS® registry. The registry is a data structure that contains information and settings for all the hardware and operating system software, as well as information and settings for most non-operating system software, users, preferences of the computing device, etc. In addition to reading information from a registry, the backstage component can modify the registry by adding new registry key(s) and/or value(s), modifying existing registry key(s) and/or value(s), and deleting registry key(s) and/or value(s). In some embodiments, the backstage component 106 may transition the hijacked system session from the non-interactive state to an interactive state by adding a new registry key to the registry of the remote computing device 122, and subsequently transition the system session back to the non-interactive state by deleting the registry key, which shall be discussed below.

In response to transitioning the hijacked system session to the interactive state, the backstage component 106 can generate, create, initiate, launch or spawn a virtual or hidden desktop within the hijacked system session to be displayed on a display device of the host computing device (e.g., 120). In some embodiments, the backstage component 106 may communicate with the shell component 124 executing on the remote computing device 122 to compose one or more windows stations within the hijacked system session to generate the hidden desktop. For example, the backstage component 106 may cause the shell component 124 to create a graphical environment on the hijacked system session, and transmit the graphical environment to the RMS 102 or host computing device 120. The shell component 124 can transmit the graphical environment using a proprietary communication protocol. The backstage component 106 may cause the shell component 124 to create a desktop and a windows station on the hijacked system session by capturing each window (e.g., PrintWindow function), performing a desktop composition for each window, and maintaining z-order for each window. The backstage component 106 can cause the shell component 124 to intercept all session calls. The shell component 124 can include or interface with a desktop composition manager that is managed by a graphics card of the remote computing device 122.

Such a hidden desktop may sometimes be referred to as a hidden desktop session. This hidden desktop session can include, launch, or initiate an interactive power shell, such as an automated task framework with a command line shell and a scripting language integrated into the .NET framework, which can be embedded within other applications. This hidden desktop session can also include, launch, or initiate an interactive command window by default. This hidden desktop session can also include, launch, or initiate other applications, including interactive applications with a GUI. The applications, including the power shell and command window, can allow the host machine to access and work on the remote machine without interrupting the end user of the remote machine. Thus, technicians can manage, debug, and remediate issues remotely through the host client interface of the present technical solution with a full interactive power shell and command window, without interfering with or observing the work of the end user.

In response to the backstage component 106 generating the hidden desktop (session), the backstage component 106 may communicate with the toolbox component 108 to provide one or more toolboxes. The one or more toolboxes may be provided over the hidden desktop. Examples of such toolboxes can include at least one of: small scripts, single line executables, simple text, or img files. In some embodiments, the toolbox component 108 can include or provide the toolboxes to launch one or more web applications running in the hijacked system session. In some embodiments, the web application may be interactive over the hidden desktop. Examples of such web application can include at least one of: browsers, text editors, or low GUI applications.

In response to the backstage component 106 generating the hidden desktop (session), the backstage component 106 may communicate with the controller component 110 to receive, obtain, or otherwise identify one or more instructions inputted through the hidden desktop by the host computing device 120 to update a configuration of the remote computing device 122 in a hidden manner. The controller component 110 can identify one or more instructions from the host computing device 120 and process the instructions. For example, the controller component 110 can identify the instruction inputted through the hidden desktop by one or more input devices (e.g., a mouse, a keyboard, etc.) communicatively coupled to the host computing device 120, and process the instruction. The controller component 110 can convert the identified instruction into a command to provide to the remote computing device 122 for updating the configuration of the remote computing device 122. The controller component 110 can overlay or embed the command in the communication channel established between the remote computing device 122 and the interface 104. The controller component 110 can open or establish or utilize a different communication channel to transmit commands to the remote computing device 122.

The controller component 110 can receive instructions from the remote computing device 122 and use one or more policies or instructions to determine a type of command to generate and transmit to the remote computing device 122.

In some cases, the controller component 110 can include, access or utilize a remote monitoring and management (RMM) system to implement the instruction via an agent executing on the remote computing device 122. The RMM can take control of a device identified in the video stream. For example, the controller component 110 can map an identifier or characteristic of the device to the device identifier, and provide the device identifier to the RMM. The RMM can, via the network 105, connect with the device or manage the device. The RMM can update the device in the video stream, or push a configuration to the device in the video stream.

In response to receiving the instructions, the backstage component 106 may cause the shell component 124 to execute, in a hidden manner, the instructions within the hijacked system session to update the configuration of the remote computing device 122. Simultaneously with or subsequently to executing, in a hidden manner, the instructions on the remote computing device 122, the backstage component 106 may receive a command from the host computing device 120. In response to the reception of the command, the backstage component 106 may transition the hijacked system session from the interactive state back to the non-interactive state to terminate the hijacked system session. In some embodiments, the backstage component 106 may transition the hijacked system session from the interactive state to the non-interactive state by deleting a registry key (e.g., the previously added registry key) from the registry of the remote computing device 122.

Further, the backstage component 106 can monitor, detect, or otherwise manage whether the instructions have been executed on the remote computing device 122. The backstage component 106 may close the support ticket associated with the remote computing device 122 in response to detecting that the instructions have been executed on the remote computing device 122 and/or receiving the command to terminate the hijacked system session from the host computing device 120. Upon closing the support ticket, the backstage component 106 may communicate with support server 130 to update the status of the support ticket in the database 132.

FIGS. 1B, 1C, 1D, 1E, 1F, and 1G are illustrative operations or graphical user interfaces provided by the system 100 depicted in FIG. 1A. In some embodiments, each of FIGS. 1B-1G may be associated with an operation that the system 100 (e.g., RMS 102) performs in response to the input of a user (e.g., the selection of a technician). The illustrated embodiments of the operations of FIGS. 1B-1G are merely an example. Therefore, it should be understood that any of one or more operations may be omitted, re-sequenced, and/or added while remaining within the scope of the present disclosure In FIG. 1B, the RMS 102 provides a user interface 140 including an access screen to allow selection of a remote computing device (e.g., remote computing devices 144, 146, and 148) from a list of remote computing device 142. In some embodiments, the RMS 102 may communicate with the support server 130 to retrieve the list of remote computing device 142. The list 142 may include one or more remote computing devices that have each generated one or more support lists in the database 132. The RMS 102 may organize, arrange, compile, or otherwise manage a sequence of the remote computing devices on the list 142 based on respective priorities. For example, the RMS 102 may determine that the remote computing device 122 is associated with a support ticket that has a highest priority; the remote computing device 146 is associated with a support ticket that has a medium priority; and the remote computing device 148 is associated with a support ticket that has a lowest priority. Accordingly, the RMS 102 can organize the remote computing devices 122, 146, and 148 to be on the top, in the middle, and the bottom of the list 142, respectively, as shown in FIG. 1B.

Figure 1C:
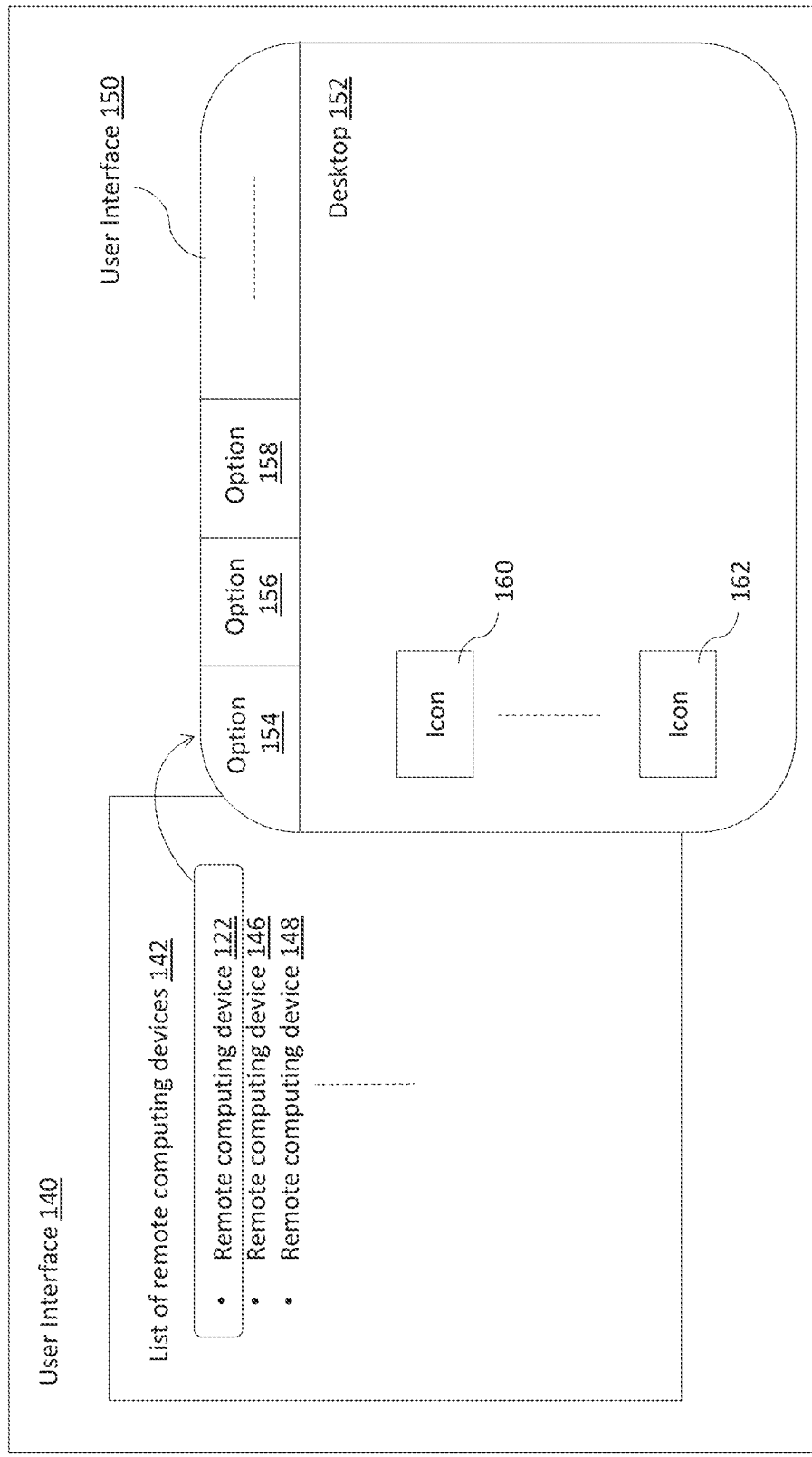

FIG. 1C depicts the RMS 102 selecting one of the remote computing devices (e.g., 122 in the illustrated embodiment of FIG. 1C) and accessing the remote computing device 122. In response to selecting the remote computing device 122 (or identifying the remote computing device 122 being selected), the RMS 102 may provide a user interface 150. The user interface 150 may present, display or otherwise include a desktop 152 of the remote computing device 122, which can include one or more icons 160 and 162. The desktop 152 may reside within a session different from a system session of the remote computing device 122, which allows the icons 160-162 to be interactive. In some embodiments, the user interface 150 may include a number of options 154, 156, and 158, each of which may be configured to provide further functions (e.g., launch one or more additional user interfaces, establish a hidden desktop, etc.).

Figure 1D:
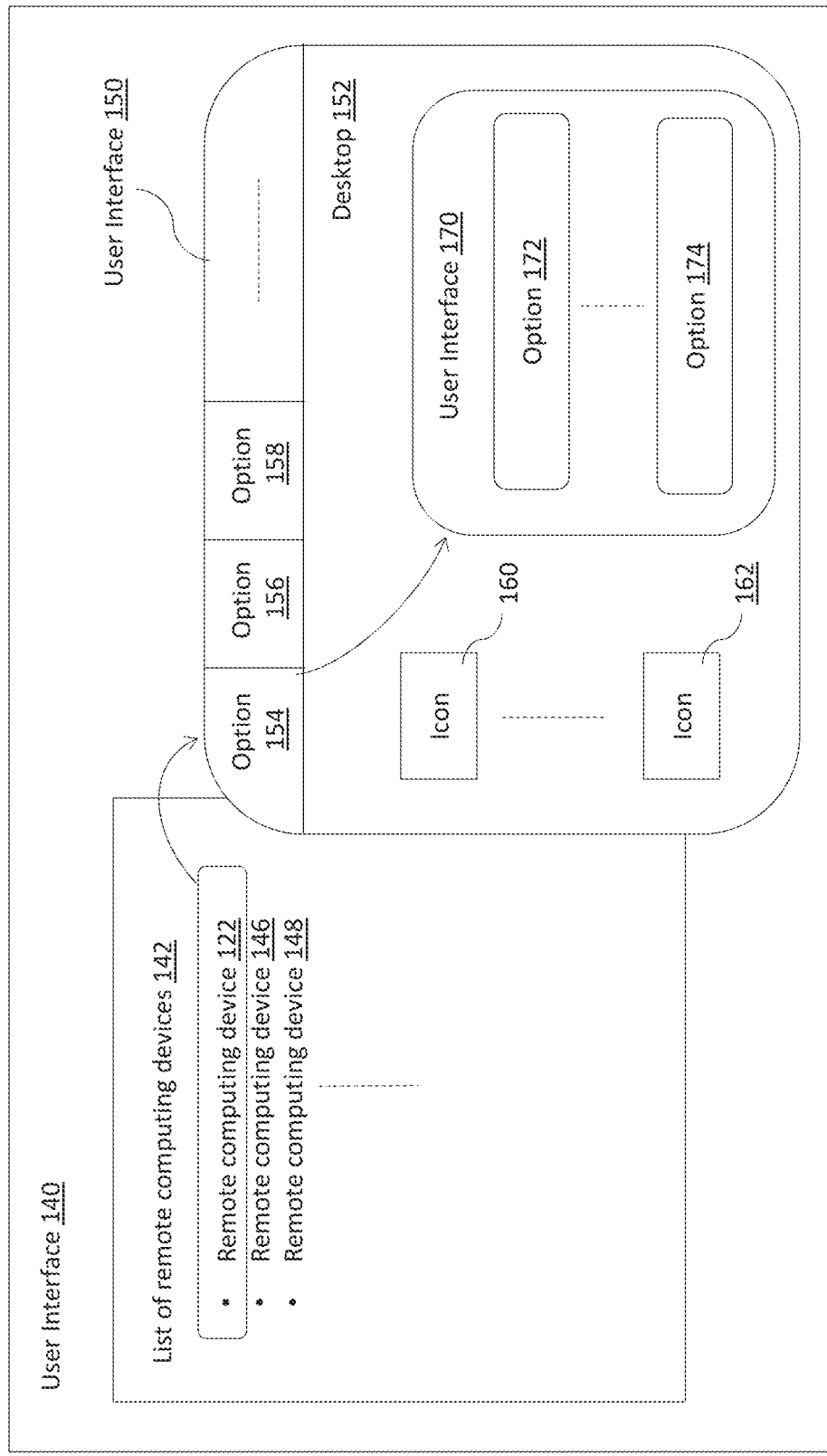

FIG. 1D depicts the RMS 102 opening a user interface 170 to initiate establishing a hidden desktop. The RMS 102 can open, present, or provide the user interface 170 in response to detecting one or more of the options 154-158 being selected. For example, in response to detecting that the option 154 is selected, the RMS 102 may provide the user interface 170. The user interface 170 can include one or more options 172 and 174, wherein at least one of the options 172-174 may represent a selectable button regarding whether to establish a hidden desktop for the remote computing device 122.

Figure 1E:
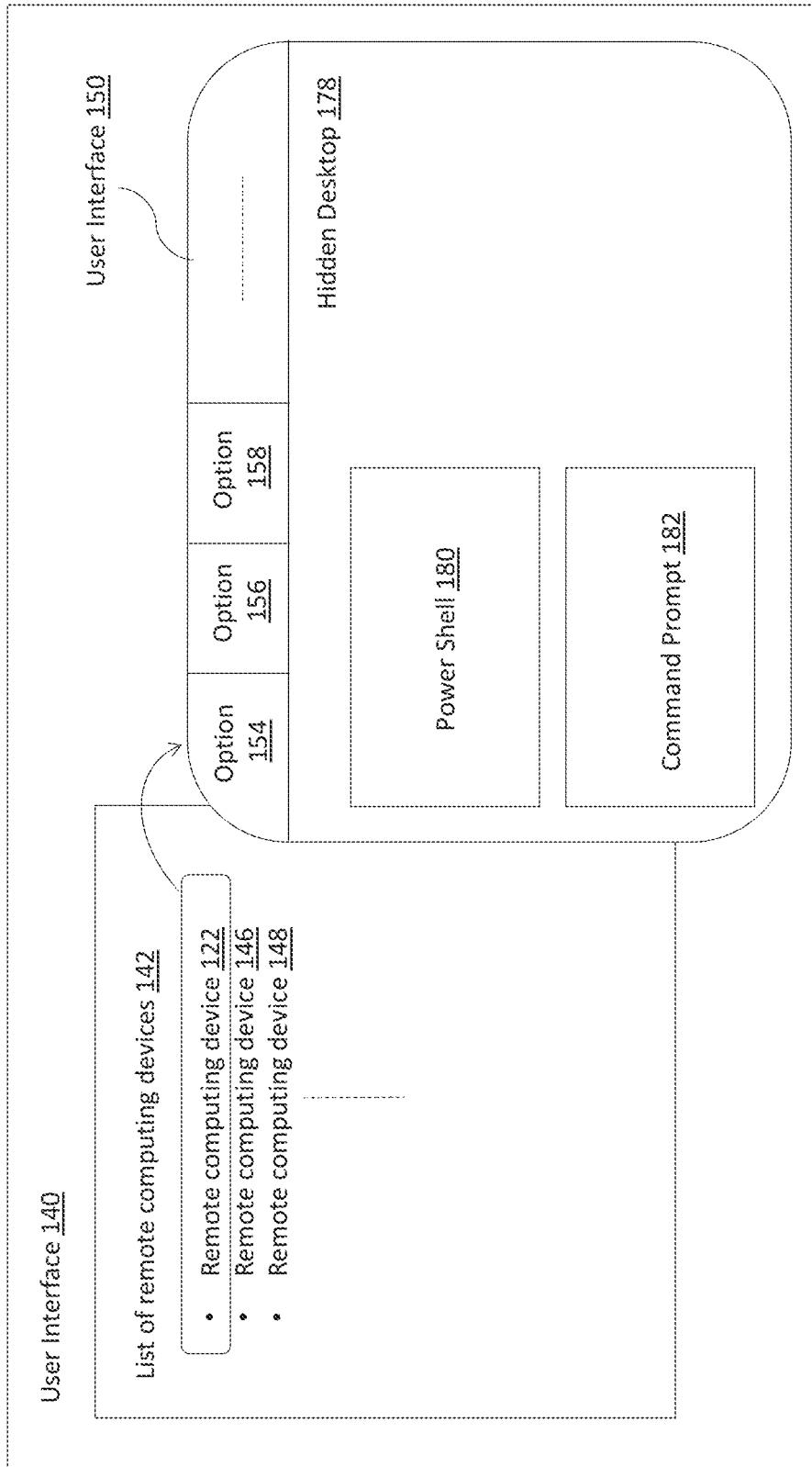

In response to detecting that the option 174 is selected (e.g., to establish a hidden desktop), FIG. 1E depicts the RMS 102 initiating a hidden desktop 178. As discussed above, the RMS 102 may establish the hidden desktop 178 by hijacking a system session of the remote computing device 122, transitioning the hijacked system session from a non-interactive state to an interactive state, and/or composing one or more windows stations within the hijacked system session to provide the hidden desktop. In response to establishing the hidden desktop 178, the RMS 102 can spawn interactive windows, such as a power shell 180 and command prompt 182, with the hidden desktop 178.

Figure 1F:
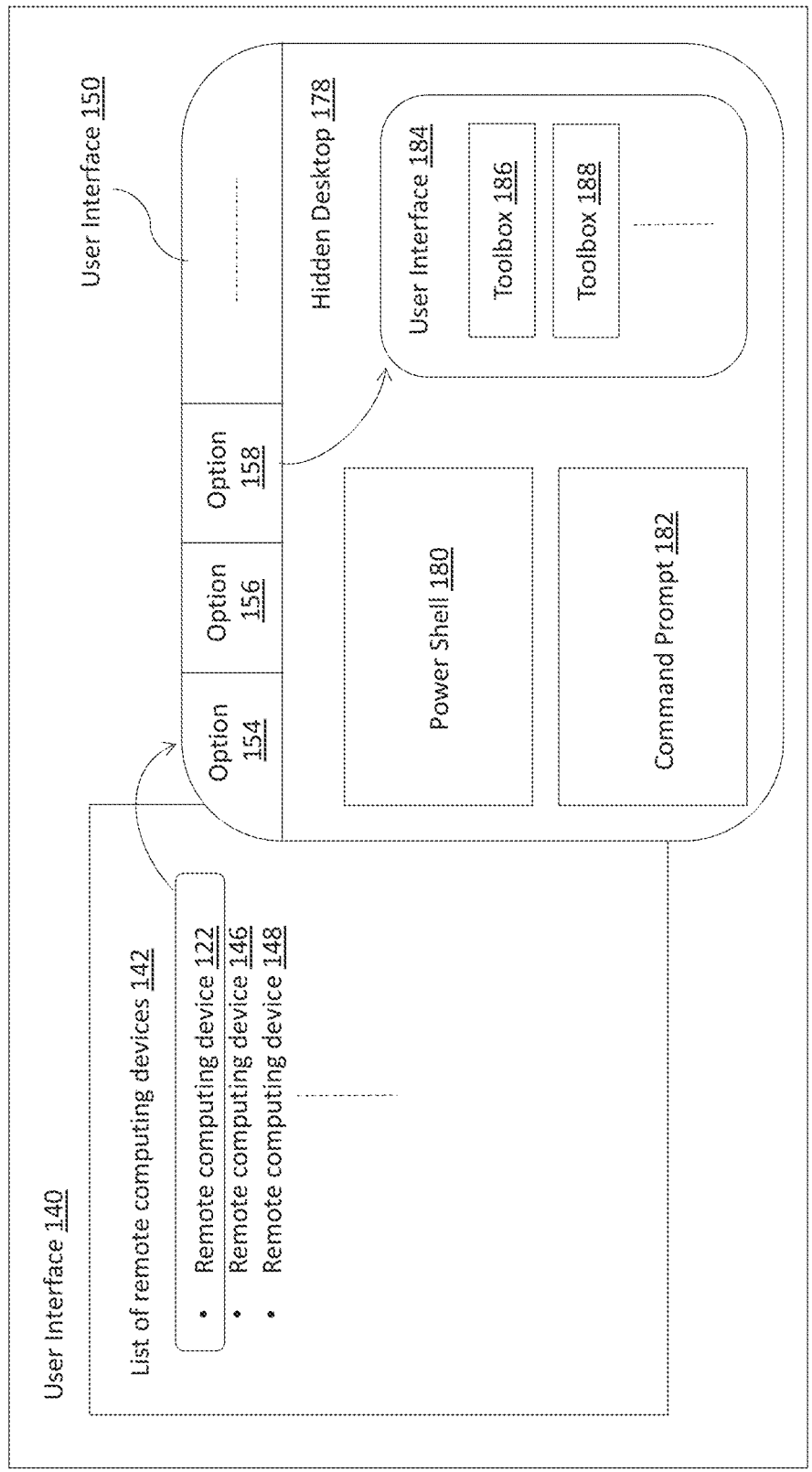
Figure 1G:
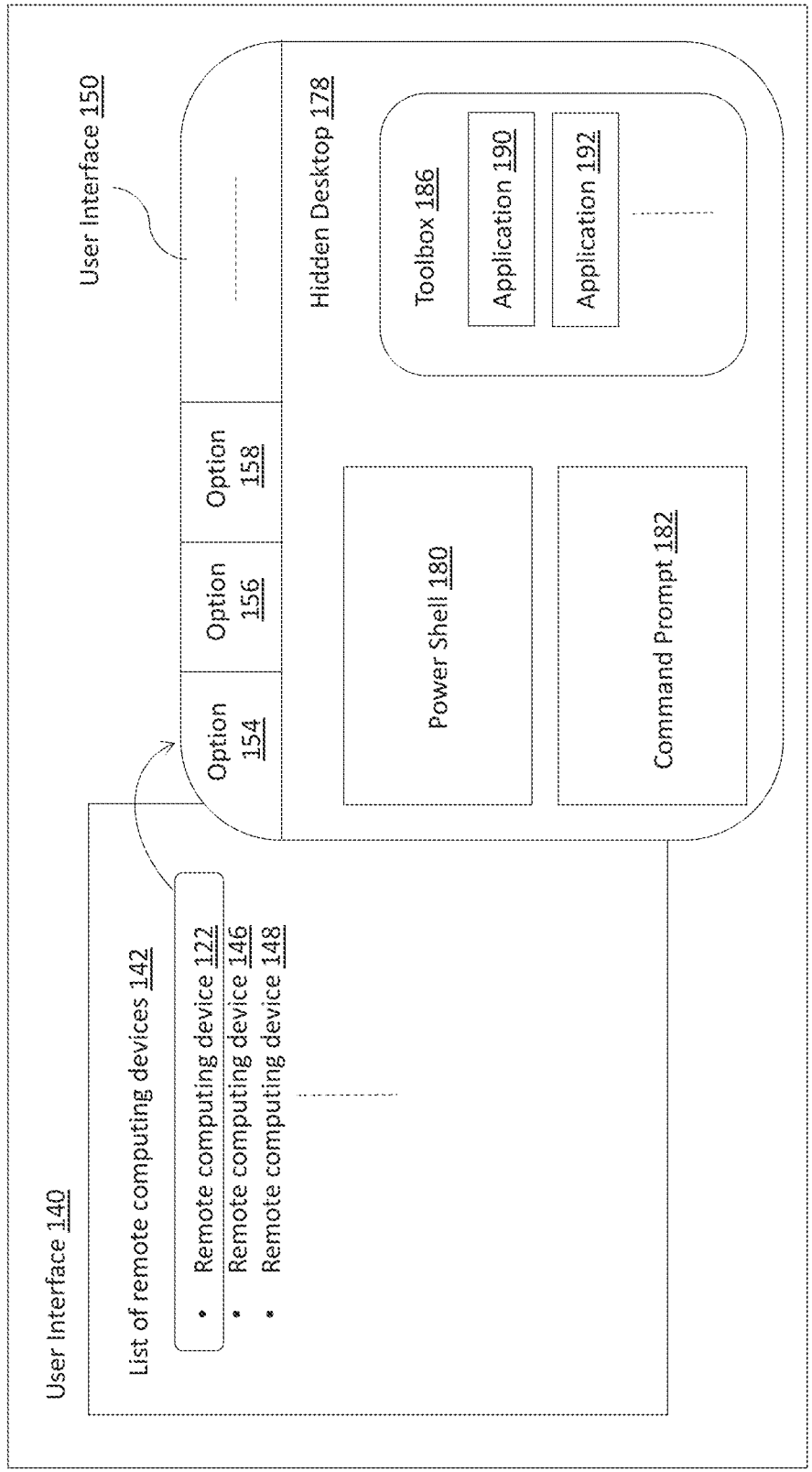

FIG. 1F depicts the RMS 102 providing a user interface 184 in response to detecting that the option 158 is selected. While providing the hidden desktop 178, the RMS 102 may allow one or more of the options 154-158 to remain selectable. In the illustrated embodiment of FIG. 1F, the option 158 may represent a selectable button to launch the user interface 184 that has a number of selectable toolboxes. The user interface 184 can include a list of toolboxes 186-188 to be selected to each launch an application. FIG. 1G depicts the RMS 102 providing access to the applications 190-192 provided by the selected toolbox 186.

Figure 2A:
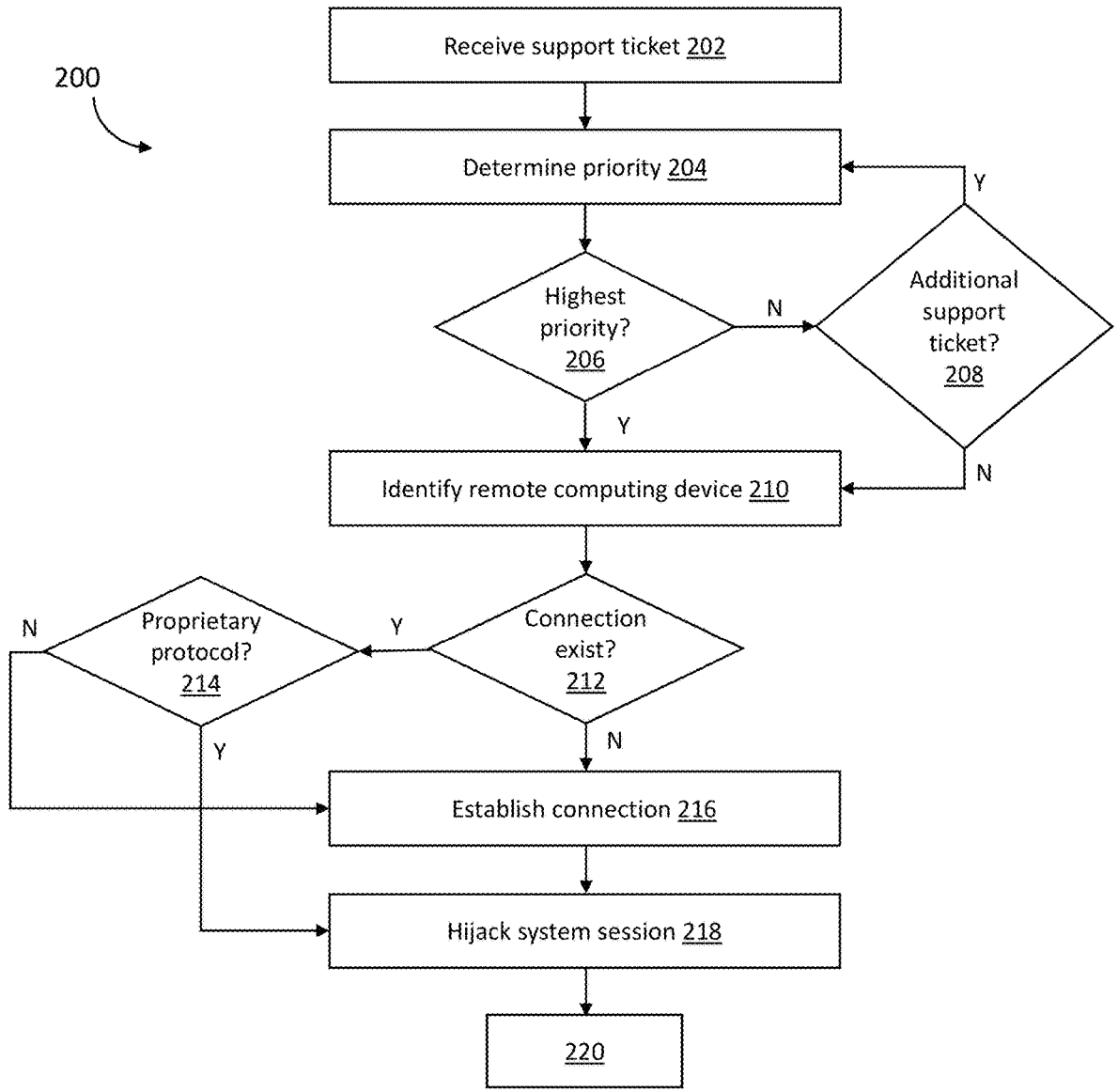
FIGS. 2A-2B are an illustrative flow diagram of an example embodiment of a method for remote perspective and control of information technology infrastructure.
Figure 2B:
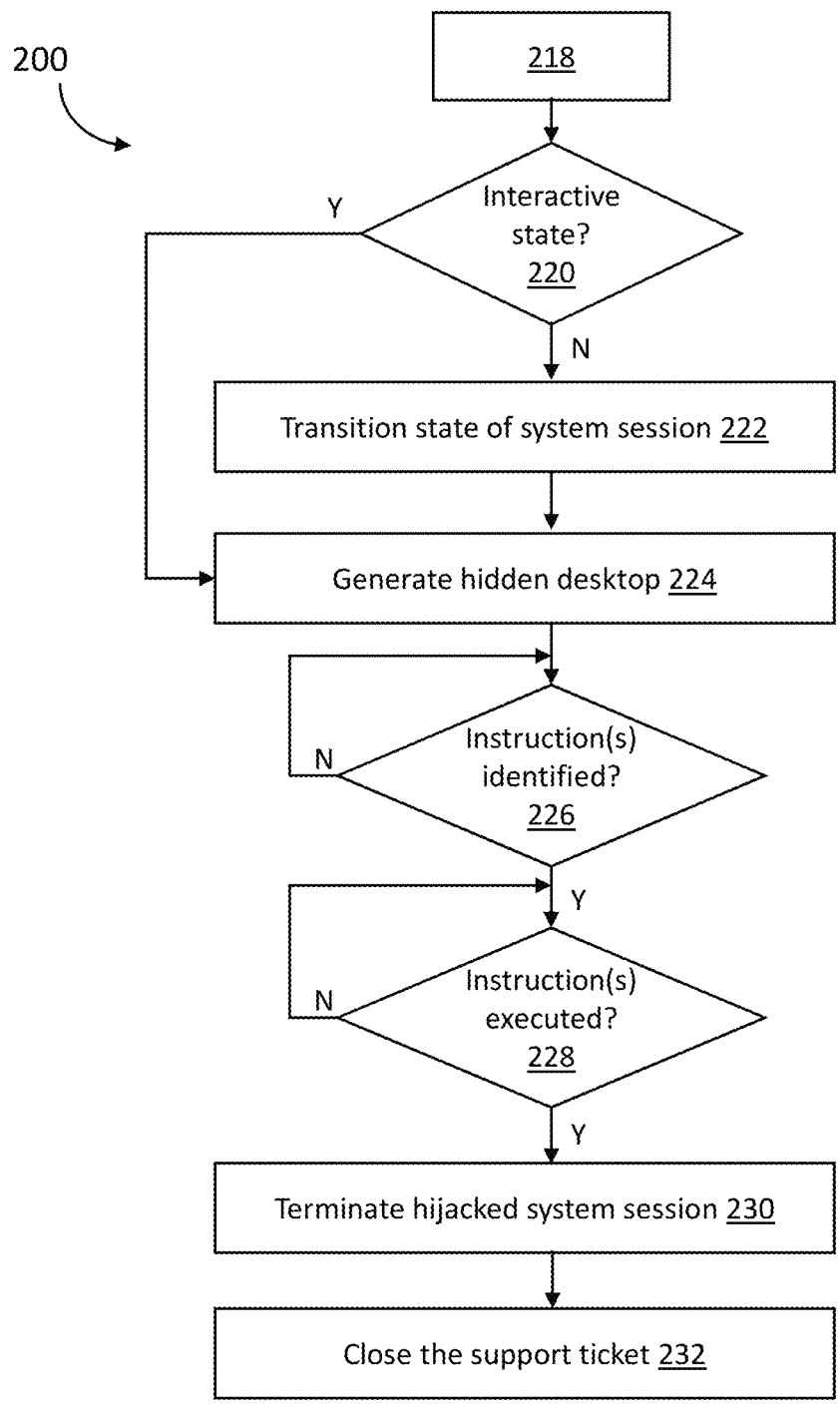

Referring to FIGS. 2A and 2B, depicted is a flow diagram of one embodiment of a method 200 for remotely managing computing devices. The method 200 for remotely managing computing devices can be based on hijacking the system session of a remote computing device, transitioning the hijacked system session from a non-interactive state to an interactive state, and/or composing one or more windows stations within the hijacked system session to provide a hidden desktop. The functionalities or operations of the method 200 may be implemented using, or performed by the components detailed herein in connection with FIGS. 1A-1G.

In brief overview, a remote management system (RMS) can receive a support ticket at operation 202. The RMS can determine a priority of the support ticket at operation 204. Next, at operation 206, the RMS can determine whether the priority is the highest. If not, the RMS can determine whether there is an additional support ticket at operation 208. If so, the RMS can identify a remote computing device associated with the support ticket. At operation 208, if there is an additional support ticket, the method 200 may proceed again to operation 204; and on the other hand, if not, the method 200 may proceed to operation 210. At operation 212, the RMS may determine whether a connection exists. If so, the RMS may further determine whether the connection is under a proprietary protocol at operation 214. If not, the RMS may establish a connection at operation 216. At operation 214, if the existing connection is not under a proprietary protocol, the method 200 may proceed to operation 216; and on the other hand, if the existing connection is under a proprietary protocol, the method 200 may proceed to operation 218. At operation 218, the RMS can hijack a system session of the identified remote computing device. Next, at operation 220, the RMS can determine whether the system session is in an interactive state. If not, the RMS can transition the system session to an interactive state at operation 222, and generate a hidden desktop at operation 224. If so (e.g., the system session has been in the interactive state), the method 200 may proceed directly to operation 224. At operation 226, the RMS can determine whether one or more instruction have been identified. If not, the RMS may continue identifying at least one instruction (e.g., performing again operation 226); and on the other hand, if so, the RMS can detect whether the one or more instructions have been executed at operation 228. If not, the RMS may continue detecting whether the one or more instructions have been executed (e.g., performing again operation 228); and on the other hand, if so, the RMS can terminate the hijacked system session at operation 230. Next, the RMS can close the support ticket at operation 232.

Referring to operation 202, the RMS (e.g., RMS 102) can receive a support ticket. In some embodiments, the RMS 102 can communicate with a support server (e.g., support server 130) to receive a support ticket. A remote computing device (e.g., remote computing device 122) may initiate the generation of such a support ticket based on determining that the remote computing device needs to be re-configured, maintained, repaired, or updated. In response to the determination, the remote computing device may communicate with the support server to generate a support ticket.

While generating the support ticket, the support server may associate the support ticket with a timestamp, which can be when the remote computing device initiate generating the support ticket and/or when the support server generates the support ticket, and an identifier of the particular remote computing device. As such, the support server can manage a number of support tickets, each of which may be associated with an identical or different remote computing device and timestamp. For example, a remote computing device may communicate with the support server to generate multiple support tickets at respective different times. In another example, a first remote computing device may communicate with the support server to generate a first support ticket and a second remote computing device may communicate with the support server to generate a second support ticket at about the same time. By associating each of the support tickets with a respective device identifier and a respective timestamp, the support server may manage respective statuses of the support tickets.

Referring to operation 204, the RMS can determine a priority of the received support ticket. The RSM may communicate with the support server to retrieve a status of the support ticket, which may include information regarding a timestamp and/or an identifier of the remote computing device (e.g., 122). The RMS can determine a priority of the support ticket based on the status. For example, the RMS may determine whether a difference between the timestamp and a current time is less than a predefined threshold. If so, the RMS may determine the priority to be high; and if not, the RMS may determine the priority to be low. In another example, the RMS may determine whether a difference between the timestamp and a current time is less than a first predefined threshold. If so, the RMS may determine the priority to be high; and if not, the RMS may further determine whether the difference is less than a second predefined threshold. If so, the RMS may determine the priority to be medium; and if not, the RMS may determine the priority to be low.

At operation 206, the RMS can determine whether the priority of the support ticket is the highest. In some cases, the RMS may receive one or more support tickets, each of which may be associated with a respective priority. The RMS may identify the remote computing device (e.g., remote computing device 122) based on determining that an associated support ticket has the highest priority, which leads the method 200 to operation 210. Referring again to operation 206, in response to determining that the support ticket does not have the highest priority (e.g., a medium or low priority), the RMS can determine whether one or more additional support tickets have been received. If so (e.g., one or more other support tickets from the remote computing device 122, one or more support tickets from a remote computing device different than the remote computing device 122), the RMS can identify a remote computing device by comparing the respective priorities. On the other hand, if not (e.g., the RMS received one support ticket only from the remote computing device 122), the RMS may automatically identify the remote computing device.

In response to identifying the remote computing device, referring to operation 212, the RMS may determine whether a connection exists between the remote computing device and a host computing device (e.g., host computing device 120). If so, the RMS may further examine, detect, or otherwise determine whether the existing connection is established under a proprietary protocol (operation 214). Examples of the proprietary protocol includes at least one of: a transmission control protocol (TCP), a virtual network computing (VNC) protocol, a remote desktop protocol (RDP), or the like. On the other hand, if not (e.g., no existing connection), the RMS may establish a connection communicatively coupling the remote computing device to the host computing device under the proprietary protocol (operation 216). Referring again to operation 214, if the RMS determines that connection is not established under the proprietary protocol, the RMS may establish a new connection communicatively coupling the remote computing device to the host computing device under the proprietary protocol (operation 216). If the RMS determines that connection is established under the proprietary protocol, the RMS may hijack a system session (e.g., session 0) of the remote computing device (operation 218).

At operation 218, the RMS may communicate with a shell component executing on the remote computing device to hijack, commandeer, overtake or otherwise utilize the system session of the remote computing device. The system session can provide a separate windows station that is initially marked as non-interactive and used for windows services. By hijacking such a system session, the RMS can perform various actions on the hijacked system session (e.g., create a graphical environment on session 0, transmit the graphical environment to the host computing device) without interrupting an end user of the remote computing device.

In response to hijacking the system session of the remote computing device, the RMS may determine whether the hijacked system session is in an interactive state (operation 220). In response to determining that the system session is not in the interactive state, the RMS can transition the system session to the interactive state (operation 222). For example, the RMS may add a new registry key to a registry executing on the remote computing device to transition the system session from a non-interactive state to the interactive state. In response to transitioning the system session to the interactive state, the RMS may generate a hidden desktop within the hijacked, interactive system session (operation 224). Referring again to operation 220, if the RMS determines that the system session has been in the interactive state (e.g., which may be due to a previous transition), the RMS can directly generate a hidden desktop within the hijacked, interactive system session (operation 224).

At operation 224, the RMS generate, create, initiate, launch or spawn a virtual or hidden desktop within the hijacked system session to be displayed on a display device of the host computing device (e.g., 120). The RMS may communicate with the shell component executing on the remote computing device to compose one or more windows stations within the hijacked system session to generate the hidden desktop. For example, the backstage component 106 may cause the shell component to create a graphical environment on the hijacked system session, and transmit the graphical environment to the RMS or host computing device.

Upon the hidden desktop being generated, the RMS may determine whether one or more instructions have been identified through the hidden desktop. In some embodiments, the RMS may communicate with the host computing device to identify whether one or more instructions have been inputted through the hidden desktop displayed to the host computing device. Such instructions may be inputted as one or more commands into a power shell and/or command prompt of the hidden desktop so as to repair, modify, or update a configuration of the remote computing device. If the RMS determines that no instruction has been identified ("N" branch from operation 226), the RMS may continue identifying any instruction. On the other hand, if the RMS has identified at least one instruction inputted through the hidden desktop ("Y" branch from operation 226), the RMS may determine whether the instruction is executed on the remote computing device (operation 228).

At operation 228, the RMS may communicate with the remote computing device to determine whether the identified instructions have been executed on the remote computing device. The remote computing device may execute, in a hidden manner, the instructions in the hijacked system session, i.e., the execution of the instruction is invisible or unnoticeable to an end user of the remote computing device. If the RMS determines that the instructions have not been executed on the remote computing device ("N" branch from operation 228), the RMS may continue detecting whether the remote computing device has executed the instruction. On the other hand, if the RMS determines that the instructions have been executed on the remote computing device ("Y" branch from operation 228), the RMS may terminate the hijacked system session (operation 230).

At operation 230, the RMS may terminate the hijacked system session in response to receiving a command from the host computing device. The RMS may receive such a command through the hidden desktop. The RMS may terminate the hijacked system session by transitioning the system session from the interactive state back to the non-interactive state. The RMS may remove or delete a registry key from the registry executing on the remote computing device to transition the system session back to the non-interactive state.

Simultaneously with or subsequently to terminating the hijacked system session, at operation 232, the RMS may close the support ticket associated with the remote computing device. For example, in response to receiving the command (to terminate the hijacked system session) from the host computing device, the RMS may communicate with the support server to close the support ticket. In some embodiments, the RMS may move forward to a successive support ticket (e.g., a support ticket with the second highest priority) to hijack a system session of the corresponding remote computing device, generate a hidden desktop in the hijacked system session, and update, in a hidden manner, a configuration of the remote computing device according to one or more instructions inputted through the hidden desktop.

Figure 3A:
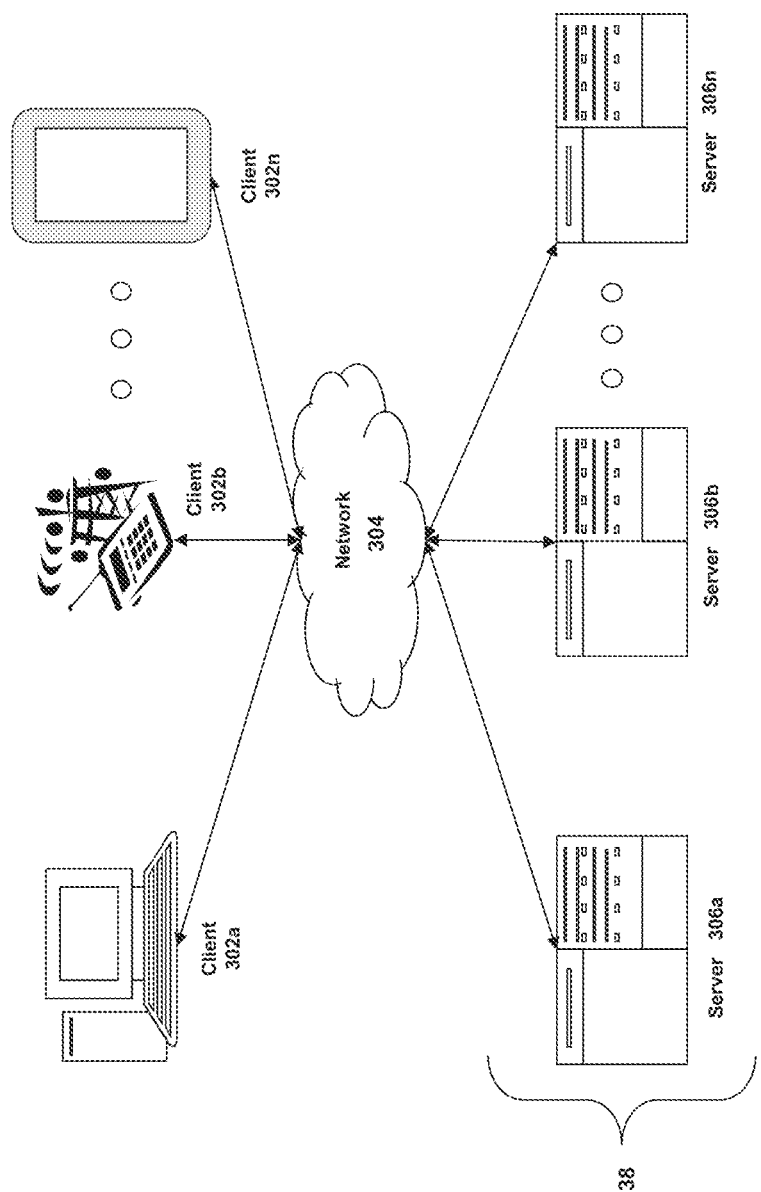
FIG. 3A is a block diagram depicting an embodiment of a network environment comprising client device in communication with server device.

Referring to FIG. 3A, an embodiment of a network environment that can be used in connection with the methods and systems described herein is depicted. In brief overview, the network environment includes one or more clients 302a-302n (also generally referred to as local machine(s) 302, client(s) 302, client node(s) 302, client machine(s) 302, client computer(s) 302, client device(s) 302, endpoint(s) 302, or endpoint node(s) 302) in communication with one or more servers 306a-306n (also generally referred to as server(s) 306, node 306, or remote machine(s) 306) via one or more networks 304. In some embodiments, a client 302 has the capacity to function as both a client node seeking access to resources provided by a server and as a server providing access to hosted resources for other clients 302a-302n.

Although FIG. 3A shows a network 304 between the clients 302 and the servers 306, the clients 302 and the servers 306 may be on the same network 304. In some embodiments, there are multiple networks 304 between the clients 302 and the servers 306. In one of these embodiments, a network 304' (not shown) may be a private network and a network 304 may be a public network. In another of these embodiments, a network 304 may be a private network and a network 304' a public network. In still another of these embodiments, networks 304 and 304' may both be private networks.

The network 304 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 304 may be any type and/or form of network. The geographical scope of the network 304 may vary widely and the network 304 can be a body area network (BAN), a personal area network (PAN), a local-area network (LAN), e.g. Intranet, a metropolitan area network (MAN), a wide area network (WAN), or the Internet. The topology of the network 304 may be of any form and may include, e.g., any of the following: point-to-point, bus, star, ring, mesh, or tree. The network 304 may be an overlay network which is virtual and sits on top of one or more layers of other networks 304'. The network 304 may be of any such network topology as known to those ordinarily skilled in the art capable of supporting the operations described herein. The network 304 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 304 may be a type of a broadcast network, a telecommunications network, a data communication network, or a computer network.

In some embodiments, the system may include multiple, logically-grouped servers 306. In one of these embodiments, the logical group of servers may be referred to as a server farm 38 or a machine farm 38. In another of these embodiments, the servers 306 may be geographically dispersed. In other embodiments, a machine farm 38 may be administered as a single entity. In still other embodiments, the machine farm 38 includes a plurality of machine farms 38. The servers 306 within each machine farm 38 can be heterogeneous—one or more of the servers 306 or machines 306 can operate according to one type of operating system platform (e.g., WINDOWS NT, manufactured by Microsoft Corp. of Redmond, Wash.), while one or more of the other servers 306 can operate on according to another type of operating system platform (e.g., Unix, Linux, or Mac OS X).

In one embodiment, servers 306 in the machine farm 38 may be stored in high-density rack systems, along with associated storage systems, and located in an enterprise data center. In this embodiment, consolidating the servers 306 in this way may improve system manageability, data security, the physical security of the system, and system performance by locating servers 306 and high performance storage systems on localized high performance networks. Centralizing the servers 306 and storage systems and coupling them with advanced system management tools allows more efficient use of server resources.

The servers 306 of each machine farm 38 do not need to be physically proximate to another server 306 in the same machine farm 38. Thus, the group of servers 306 logically grouped as a machine farm 38 may be interconnected using a wide-area network (WAN) connection or a metropolitan-area network (MAN) connection. For example, a machine farm 38 may include servers 306 physically located in different continents or different regions of a continent, country, state, city, campus, or room. Data transmission speeds between servers 306 in the machine farm 38 can be increased if the servers 306 are connected using a local-area network (LAN) connection or some form of direct connection. Additionally, a heterogeneous machine farm 38 may include one or more servers 306 operating according to a type of operating system, while one or more other servers 306 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 306 may comprise components, subsystems and modules to support one or more management services for the machine farm 38. In one of these embodiments, one or more servers 306 provide functionality for management of dynamic data, including techniques for handling failover, data replication, and increasing the robustness of the machine farm 38. Each server 306 may communicate with a persistent store and, in some embodiments, with a dynamic store.

Server 306 may be a file server, application server, web server, proxy server, appliance, network appliance, gateway, gateway server, virtualization server, deployment server, SSL VPN server, or firewall. In one embodiment, the server 306 may be referred to as a remote machine or a node. In another embodiment, a plurality of nodes 290 may be in the path between any two communicating servers.

Figure 3B:
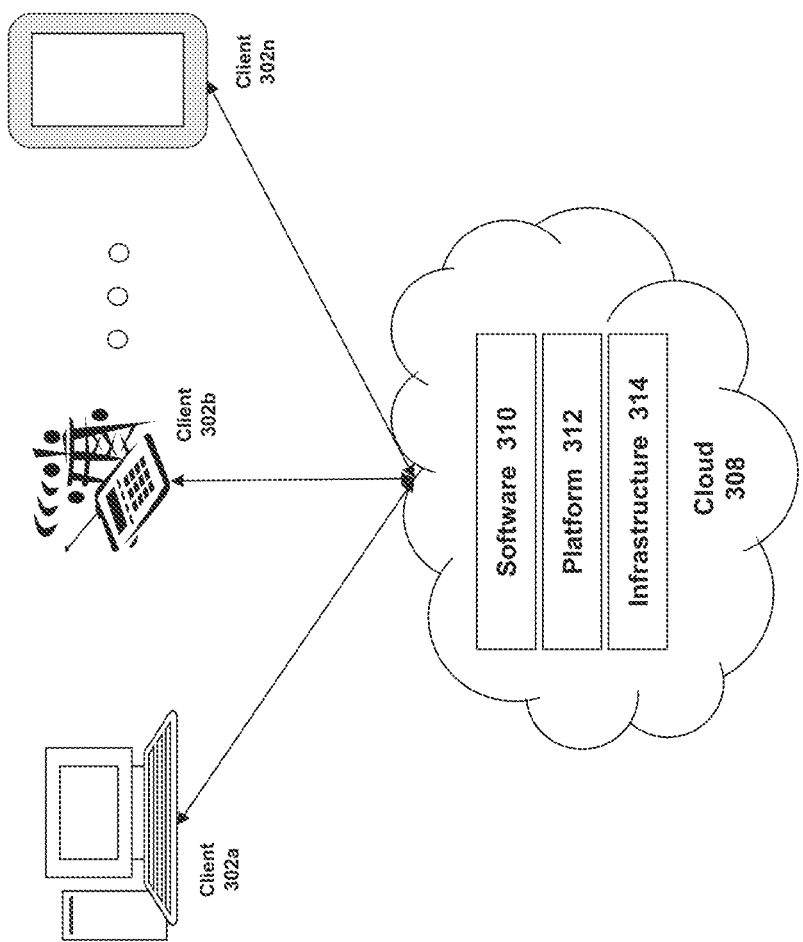
FIG. 3B is a block diagram depicting a cloud computing environment comprising client device in communication with cloud service providers.

Referring to FIG. 3B, a cloud computing environment is depicted. A cloud computing environment may provide client 302 with one or more resources provided by a network environment. The cloud computing environment may include one or more clients 302a-302n, in communication with the cloud 308 over one or more networks 304. Clients 302 may include, e.g., thick clients, thin clients, and zero clients. A thick client may provide at least some functionality even when disconnected from the cloud 308 or servers 306. A thin client or a zero client may depend on the connection to the cloud 308 or server 306 to provide functionality. A zero client may depend on the cloud 308 or other networks 304 or servers 306 to retrieve operating system data for the client device. The cloud 308 may include back end platforms, e.g., servers 306, storage, server farms or data centers.

The cloud 308 may be public, private, or hybrid. Public clouds may include public servers 306 that are maintained by third parties to the clients 302 or the owners of the clients. The servers 306 may be located off-site in remote geographical locations as disclosed above or otherwise. Public clouds may be connected to the servers 306 over a public network. Private clouds may include private servers 306 that are physically maintained by clients 302 or owners of clients. Private clouds may be connected to the servers 306 over a private network 304. Hybrid clouds 308 may include both the private and public networks 304 and servers 306.

The cloud 308 may also include a cloud based delivery, e.g. Software as a Service (SaaS) 310, Platform as a Service (PaaS) 314, and Infrastructure as a Service (IaaS) 614. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 302 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 302 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 302 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 302 may also access SaaS resources through smartphone or tablet applications, including, e.g., Salesforce Sales Cloud, or Google Drive app. Clients 302 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 3C:
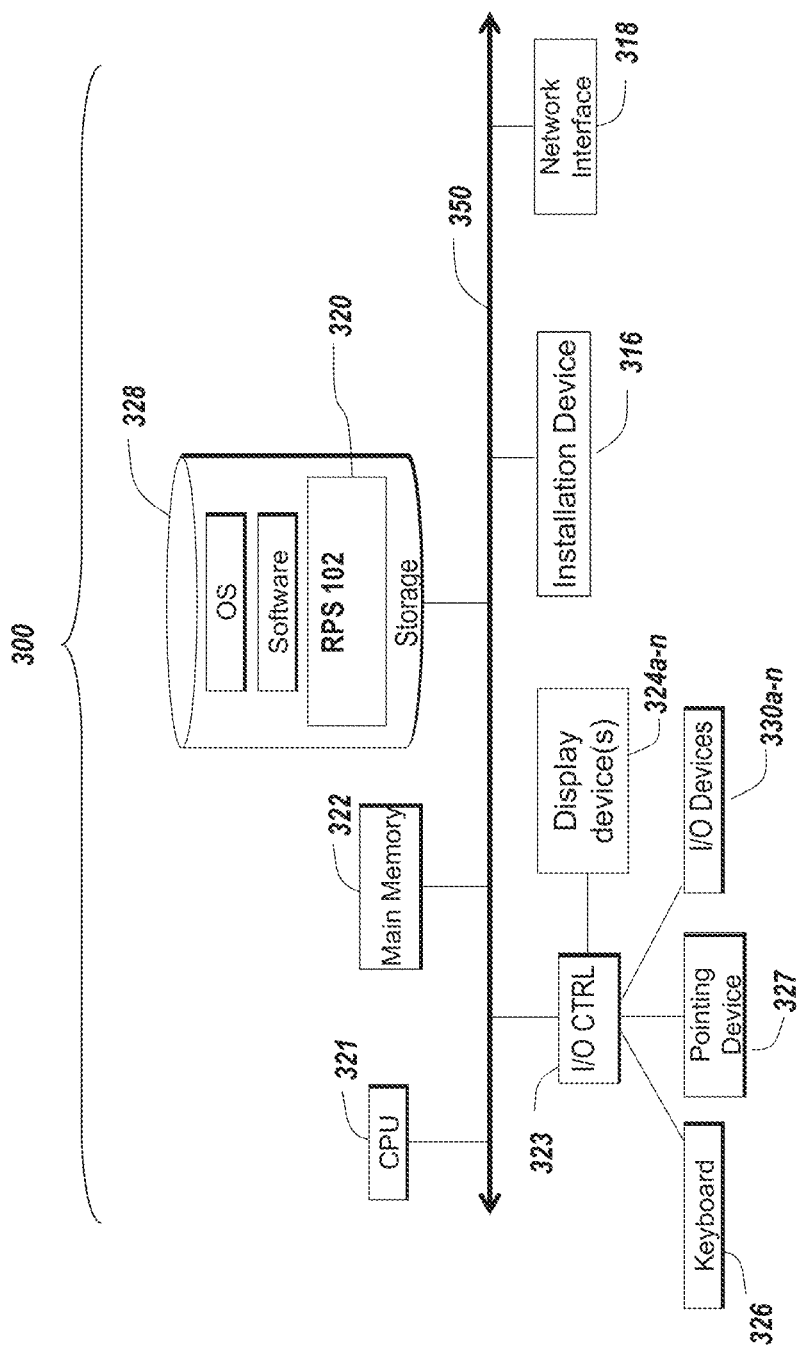
FIGS. 3C and 3D are block diagrams depicting embodiments of computing devices useful in connection with the methods and systems described herein.
Figure 3D:
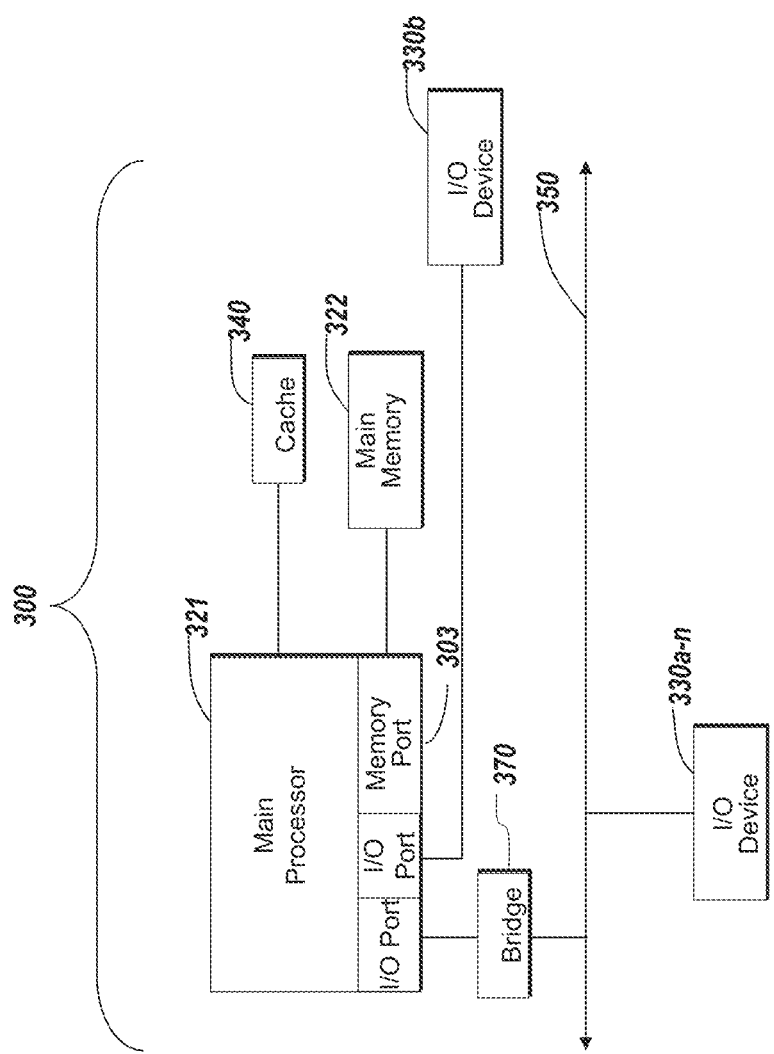

The client 302 and server 306 may be deployed as and/or executed on any type and form of computing device, e.g. a computer, network device or appliance capable of communicating on any type and form of network and performing the operations described herein. FIGS. 6C and 6D depict block diagrams of a computing device 300 useful for practicing an embodiment of the client 302 or a server 306. As shown in FIGS. 6C and 6D, each computing device 300 includes a central processing unit 321, and a main memory unit 322. As shown in FIG. 3C, a computing device 300 may include a storage device 328, an installation device 316, a network interface 318, an I/O controller 323, display devices 324a-324n, a keyboard 326 and a pointing device 327, e.g. a mouse. The storage device 328 may include, without limitation, an operating system, software, and a software of or associated with the system 100. As shown in FIG. 3D, each computing device 300 may also include additional optional elements, e.g. a memory port 303, a bridge 370, one or more input/output devices 330a-330n (generally referred to using reference numeral 330), and a cache memory 640 in communication with the central processing unit 321.

The central processing unit 321 is any logic circuitry that responds to and processes instructions fetched from the main memory unit 322. In many embodiments, the central processing unit 321 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 300 may be based on any of these processors, or any other processor capable of operating as described herein. The central processing unit 321 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 322 may include one or more memory chips capable of storing data and allowing any storage location to be directly accessed by the microprocessor 321. Main memory unit 322 may be volatile and faster than storage 328 memory. Main memory units 322 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 322 or the storage 328 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAIVI), Silicon-Oxide-Nitride-Oxide-Silicon (SONOS), Resistive RAM (RRAM), Racetrack, Nano-RAM (NRAM), or Millipede memory. The main memory 322 may be based on any of the above described memory chips, or any other available memory chips capable of operating as described herein. In the embodiment shown in FIG. 3C, the processor 321 communicates with main memory 322 via a system bus 350 (described in more detail below). FIG. 3D depicts an embodiment of a computing device 300 in which the processor communicates directly with main memory 322 via a memory port 303. For example, in FIG. 3D the main memory 322 may be DRDRAM.

FIG. 3D depicts an embodiment in which the main processor 321 communicates directly with cache memory 640 via a secondary bus, sometimes referred to as a backside bus. In other embodiments, the main processor 321 communicates with cache memory 640 using the system bus 350. Cache memory 640 typically has a faster response time than main memory 322 and is typically provided by SRAM, BSRAM, or EDRAM. In the embodiment shown in FIG. 3D, the processor 321 communicates with various I/O devices 330 via a local system bus 350. Various buses may be used to connect the central processing unit 321 to any of the I/O devices 330, including a PCI bus, a PCI-X bus, or a PCI-Express bus, or a NuBus. For embodiments in which the I/O device is a video display 324, the processor 321 may use an Advanced Graphics Port (AGP) to communicate with the display 324 or the I/O controller 323 for the display 324. FIG. 3D depicts an embodiment of a computer 300 in which the main processor 321 communicates directly with I/O device 330b or other processors 321' via HYPERTRANSPORT, RAPIDIO, or INFINIBAND communications technology. FIG. 3D also depicts an embodiment in which local busses and direct communication are mixed: the processor 321 communicates with I/O device 330a using a local interconnect bus while communicating with I/O device 330b directly.

A wide variety of I/O devices 330a-330n may be present in the computing device 300. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 330a-330n may include a combination of multiple input or output devices, including, e.g., Microsoft KINECT, Nintendo Wiimote for the WII, Nintendo WII U GAMEPAD, or Apple IPHONE. Some devices 330a-330n allow gesture recognition inputs through combining some of the inputs and outputs. Some devices 330a-330n provides for facial recognition which may be utilized as an input for different purposes including authentication and other commands. Some devices 330a-330n provides for voice recognition and inputs, including, e.g., Microsoft KINECT, SIRI for IPHONE by Apple, Google Now or Google Voice Search.

Additional devices 330a-330n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 330a-330n, display devices 324a-324n or group of devices may be augment reality devices. The I/O devices may be controlled by an I/O controller 323 as shown in FIG. 3C. The I/O controller may control one or more I/O devices, such as, e.g., a keyboard 326 and a pointing device 327, e.g., a mouse or optical pen. Furthermore, an I/O device may also provide storage and/or an installation medium 316 for the computing device 300. In still other embodiments, the computing device 300 may provide USB connections (not shown) to receive handheld USB storage devices. In further embodiments, an I/O device 330 may be a bridge between the system bus 350 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 324a-324n may be connected to I/O controller 323. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 324a-324n may also be a head-mounted display (HMD). In some embodiments, display devices 324a-324n or the corresponding I/O controllers 323 may be controlled through or have hardware support for OPENGL or DIRECTX API or other graphics libraries.

In some embodiments, the computing device 300 may include or connect to multiple display devices 324a-324n, which each may be of the same or different type and/or form. As such, any of the I/O devices 330a-330n and/or the I/O controller 323 may include any type and/or form of suitable hardware, software, or combination of hardware and software to support, enable or provide for the connection and use of multiple display devices 324a-324n by the computing device 300. For example, the computing device 300 may include any type and/or form of video adapter, video card, driver, and/or library to interface, communicate, connect or otherwise use the display devices 324a-324n. In one embodiment, a video adapter may include multiple connectors to interface to multiple display devices 324a-324n. In other embodiments, the computing device 300 may include multiple video adapters, with each video adapter connected to one or more of the display devices 324a-324n. In some embodiments, any portion of the operating system of the computing device 300 may be configured for using multiple displays 324a-324n. In other embodiments, one or more of the display devices 324a-324n may be provided by one or more other computing devices 300a or 300b connected to the computing device 300, via the network 304. In some embodiments software may be designed and constructed to use another computer's display device as a second display device 324a for the computing device 300. For example, in one embodiment, an Apple iPad may connect to a computing device 300 and use the display of the device 300 as an additional display screen that may be used as an extended desktop. One ordinarily skilled in the art will recognize and appreciate the various ways and embodiments that a computing device 300 may be configured to have multiple display devices 324a-324n.

Referring again to FIG. 3C, the computing device 300 may comprise a storage device 328 (e.g. one or more hard disk drives or redundant arrays of independent disks) for storing an operating system or other related software, and for storing application software programs such as any program related to the software 320 for the experiment tracker system. Examples of storage device 328 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 328 may be non-volatile, mutable, or read-only. Some storage device 328 may be internal and connect to the computing device 300 via a bus 350. Some storage device 328 may be external and connect to the computing device 300 via a I/O device 330 that provides an external bus. Some storage device 328 may connect to the computing device 300 via the network interface 318 over a network 304, including, e.g., the Remote Disk for MACBOOK AIR by Apple. Some client devices 300 may not require a non-volatile storage device 328 and may be thin clients or zero clients 302. Some storage device 328 may also be used as an installation device 316, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 300 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 302. An application distribution platform may include a repository of applications on a server 306 or a cloud 308, which the clients 302a-302n may access over a network 304. An application distribution platform may include application developed and provided by various developers. A user of a client device 302 may select, purchase and/or download an application via the application distribution platform.

Furthermore, the computing device 300 may include a network interface 318 to interface to the network 304 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 300 communicates with other computing devices 300' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 318 may comprise a built-in network adapter, network interface card, PCMCIA network card, EXPRESSCARD network card, card bus network adapter, wireless network adapter, USB network adapter, modem or any other device suitable for interfacing the computing device 300 to any type of network capable of communication and performing the operations described herein.

A computing device 300 of the sort depicted in FIGS. 6B and 6C may operate under the control of an operating system, which controls scheduling of tasks and access to system resources. The computing device 300 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 300 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 300 has sufficient processor power and memory capacity to perform the operations described herein. In some embodiments, the computing device 300 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 300 is a gaming system. For example, the computer system 300 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 300 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 300 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 300 is a tablet e.g. the IPAD line of devices by Apple; GALAXY TAB family of devices by Samsung; or KINDLE FIRE, by Amazon.com, Inc. of Seattle, Wash. In other embodiments, the computing device 300 is a eBook reader, e.g. the KINDLE family of devices by Amazon.com, or NOOK family of devices by Barnes & Noble, Inc. of New York City, N.Y.

In some embodiments, the communications device 302 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 302 is a laptop or desktop computer equipped with a web browser and a microphone and speaker system, e.g. a telephony headset. In these embodiments, the communications devices 302 are web-enabled and can receive and initiate phone calls. In some embodiments, a laptop or desktop computer is also equipped with a webcam or other video capture device that enables video chat and video call.

In some embodiments, the status of one or more machines 302, 306 in the network 304 can be monitored as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. The computer-readable programs can be implemented in a programming language, such as LISP, PERL, C, C++, C #, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures may be performed in any order. In certain embodiments, multitasking and parallel processing may be advantageous.

While this specification contains many specific implementation details, these should not be construed as limitations on the scope of any subject matter of what may be claimed, but rather as descriptions of features specific to particular implementations of the subject matter. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of remotely managing computing devices, comprising:
    identifying, by a remote management server, a first remote computing device according to a first support ticket, the first remote computing device executing a system session zero that defaults to a non-interactive state in which system services are hidden from a user session executed by the first remote computing device for an end user of the first remote computing device;
    establishing, by the remote management server, one or more connections communicatively coupling the first remote computing device to a host computing device;
    hijacking, by the remote management server via the one or more established connections, the system session zero executed on the first remote computing device;
    transitioning, by the remote management server via the one or more established connections, the hijacked system session zero from the non-interactive state to an interactive state;
    generating, by the remote management server, a hidden desktop within the hijacked system session zero executed on the first remote computing device to be displayed on a display device of the host computing device, wherein the hidden desktop is hidden from the end user of the first remote computing device;
    identifying, by the remote management server, one or more instructions inputted through the hidden desktop by the host computing device to update a configuration of the first remote computing device; and
    terminating, by the remote management server responsive to a command from the host computing device, the hijacked system session zero by transitioning the hijacked system session zero from the interactive state to the non-interactive state.

2. The method of claim 1, further comprising:
    closing, by the remote management server, the first support ticket in response to the one or more instructions being executed, in a hidden manner, in the hijacked system session zero of the first remote computing device.

3. The method of claim 1, further comprising:
    receiving, by the remote management server from a database storing the first support ticket associated with the first remote computing device, the first support ticket responsive to the first remote computing device generating the first support ticket;

receiving, by the remote management server from the database storing a second support ticket associated with either the first remote computing device or a second remote computing device, the second support ticket responsive to the first remote computing device or the second remote computing device generating the second support ticket;

determining, by the remote management server communicating with the database, a first priority of the first support ticket based on a first status of the first support ticket;

determining, by the remote management server communicating with the database, a second priority of the second support ticket based on a second status of the second support ticket; and determining that the first priority is higher than the second priority to identify the first remote computing device.

4. The method of claim 1, wherein transitioning the hijacked system session zero from the non-interactive state to the interactive state further comprises:

adding, by the remote management server via the one or more established connections, a registry key to a registry of the first remote computing device to cause the hijacked system session zero to transition from the non-interactive state to the interactive state.

5. The method of claim 1, wherein the hidden desktop includes at least one of an interactive power shell and an interactive command prompt.

6. The method of claim 1, further comprising:

communicating, by the remote management server, with one or more web applications to provide one or more interactive user interfaces on the hidden desktop.

7. The method of claim 1, further comprising:

composing, by the remote management server, one or more windows stations within the hijacked system session zero to generate the hidden desktop.

8. The method of claim 1, further comprising:

transmitting, by the remote management server via the one or more established connections, the one or more instructions to the first remote computing device to be executed, in a hidden manner, to close the first support ticket.

9. The method of claim 1, wherein the one or more instructions are inputted through the hidden desktop by one or more input devices communicatively coupled to the host computing device.

10. The method of claim 1, further comprising:

providing, by the remote management server, one or more toolboxes to launch one or more web applications on the hidden desktop.

11. A system to remotely manage computing devices, comprising:

a remote management server comprising one or more processors and memory configured to:

identify a first remote computing device according to a first support ticket, the first remote computing device executing a system session zero that defaults to a non-interactive state in which system services are hidden from a user session executed by the first remote computing device for an end user of the first remote computing device;

establish one or more connections communicatively coupling the first remote computing device to a host computing device;

hijack the system session zero executed on the first remote computing device via the one or more established connections;

transition, via the one or more established connections, the hijacked system session zero from the non-interactive state to an interactive state;

generate a hidden desktop within the hijacked system session zero executed on the first remote computing device to be displayed on a display device of the host computing device;

identify one or more instructions inputted through the hidden desktop by the host computing device to update a configuration of the first remote computing device; and responsive to a command from the host computing device, terminate the hijacked system session zero by transitioning the hijacked system session zero from the interactive state to the non-interactive state.

12. The system of claim 11, wherein the remote management server is further configured to:

close the first support ticket in response to the one or more instructions being executed, in a hidden manner, in the hijacked system session zero of the first remote computing device.

13. The system of claim 11, wherein the remote management server is further configured to:

add a registry key to a registry of the first remote computing device to cause the hijacked system session zero to transition from the non-interactive state to the interactive state.

14. The system of claim 11, wherein the hidden desktop includes at least one of an interactive power shell and an interactive command prompt.

15. The system of claim 11, wherein the remote management server is further configured to:

communicate with one or more web applications to provide one or more interactive user interfaces on the hidden desktop.

16. The system of claim 11, wherein the remote management server is further configured to:

compose one or more windows stations within the hijacked system session zero to generate the hidden desktop.

17. The system of claim 11, wherein the remote management server is further configured to:

transmit the one or more instructions via the one or more established connections to the first remote computing device to be executed, in a hidden manner, to close the first support ticket.

18. The system of claim 11, wherein the one or more instructions are inputted through the hidden desktop by one or more input devices communicatively coupled to the host computing device.

19. The system of claim 11, wherein the remote management server is further configured to:

provide one or more toolboxes to launch one or more web applications on the hidden desktop.

20. The system of claim 11, wherein the remote management server is further configured to:

receive, from a database storing the first support ticket associated with the first remote computing device, the first support ticket responsive to the first remote computing device generating the first support ticket;

receive, from the database storing a second support ticket associated with either the first remote computing device or a second remote computing device, the second support ticket responsive to the first remote computing device or the second remote computing device generating the second support ticket;

determine a first priority of the first support ticket based on a first status of the first support ticket;

determine a second priority of the second support ticket based on a second status of the second support ticket; and determine that the first priority is higher than the second priority to identify the first remote computing device.

* * * * *